Aug. 28, 1928.
F. C. CASEY
AUTOMOBILE JACK
Filed May 23, 1927   2 Sheets-Sheet 2
1,682,066
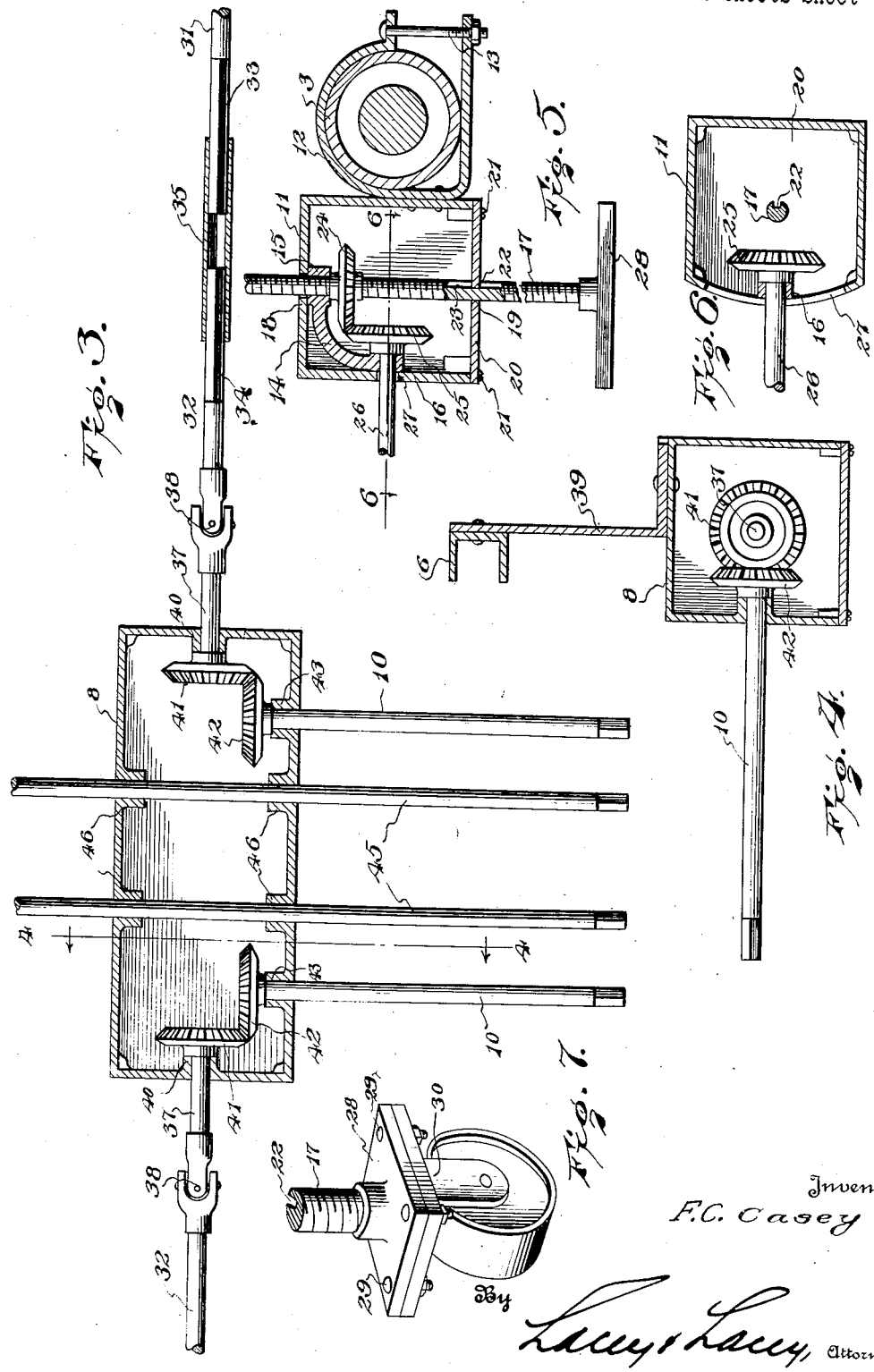

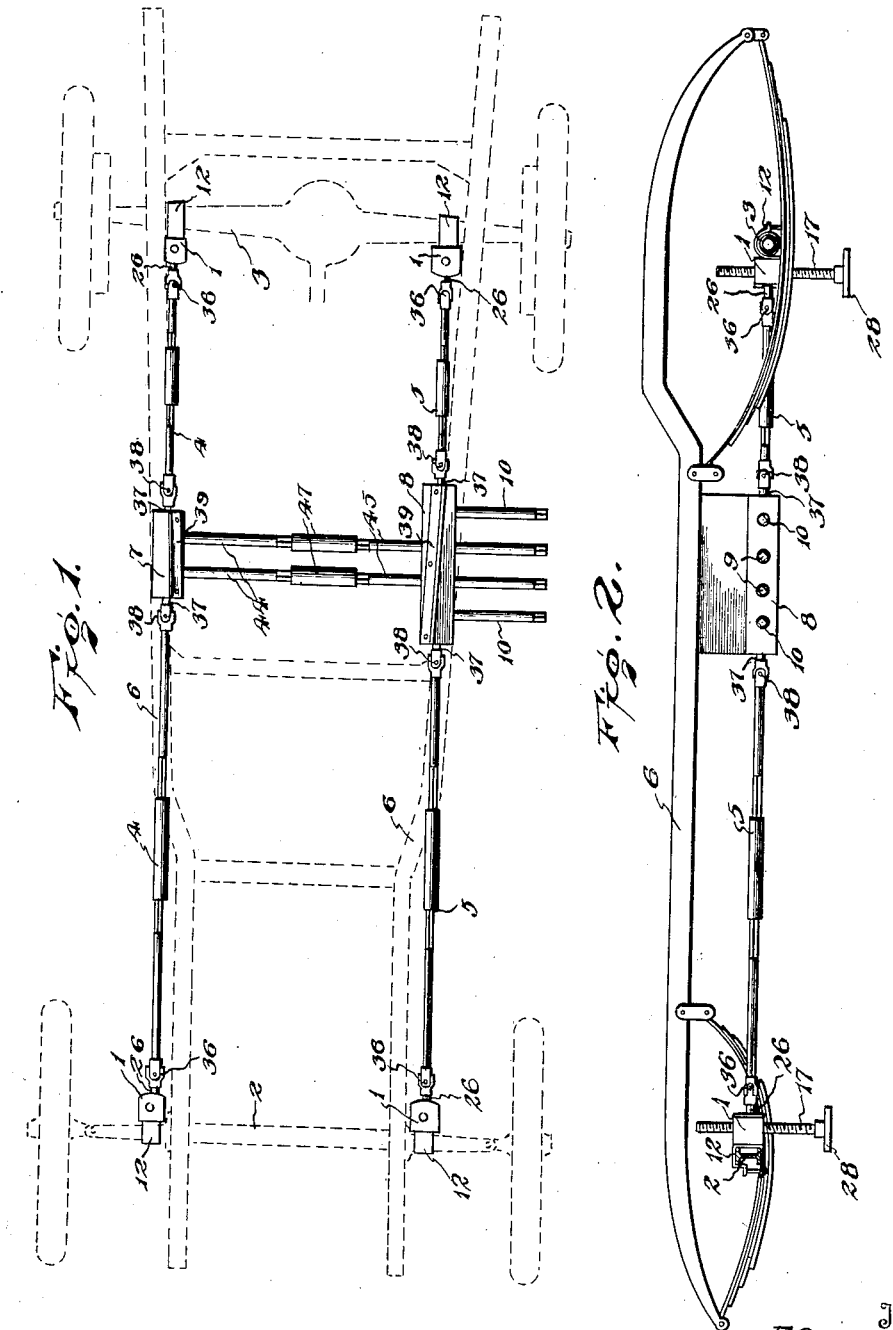

Patented Aug. 28, 1928.

1,682,066

UNITED STATES PATENT OFFICE.

FRANCIS C. CASEY, OF CLAFLIN, KANSAS.

AUTOMOBILE JACK.

Application filed May 23, 1927. Serial No. 193,689.

This invention relates to automobile jacks and more particularly to jacks which are permanently mounted upon the chassis of an automobile where they will be at all times ready for use and may be easily moved into engagement with the ground when it is necessary to elevate one or more wheels of the automobile.

One object of the invention is to provide jacks and actuating means for the same so constructed that they may be readily applied to a chassis of a conventional construction and so disposed with respect to the chassis that they will be hidden and not interfere with the usual operation of the automobile.

Another object of the invention is to provide the operating means for the jacks with actuating shafts which project from one side of the chassis beneath the running board of the automobile where they may be engaged by a turning crank and selectively rotated so that the jacks may be individually moved into engagement with the ground.

Another object of the invention is to so form the driven shafts and actuating shafts of the operating means for the jacks that they may be longitudinally adjusted to permit the jacks to be applied to either large or small automobiles and also to so construct the shafts that they will not be bent or otherwise damaged by vertical movement of the chassis relative to the axles when the automobile is passing over rough roads.

Another object of the invention is to permit casters to be connected with ground-engaging plates forming part of the jacks and thereby allow the automobile to be towed or operated with an auxiliary wheel in case a tire becomes punctured or a wheel of the automobile broken.

The invention is illustrated in the accompanying drawings, wherein

Figure 1 is a top plan view showing the improved jack mechanism applied to an automobile chassis indicated by dotted lines;

Fig. 2 is a view showing the jack mechanism and associated portions of the automobile chassis in side elevation;

Fig. 3 is an enlarged longitudinal sectional view taken through a gear housing forming part of the operating mechanism with the shafts which extend into the gear housing shown in top plan;

Fig. 4 is a transverse sectional view through the gear housing taken on the line 4—4 of Fig. 3;

Fig. 5 is an enlarged sectional view taken vertically through one of the jacks;

Fig. 6 is a horizontal sectional view taken through the jack on the line 6—6 of Fig. 5, and Fig. 7 is a fragmentary perspective view showing an auxiliary wheel or caster applied to the ground-engaging base plate of one of the jacks.

The jacks and operating mechanism are to be applied to the chassis of an automobile and by referring to Figs. 1 and 2 it will be seen that the jacks which are indicated in general by the numeral 1 are connected with the front and rear axles 2 and 3 of the chassis and engaged by shafts 4 and 5 which extend longitudinally of the chassis adjacent the side bars 6 thereof. These shafts 4 and 5 extend into gear housings 7 and 8 which are suspended from the side bars of the chassis and within the gear housings have geared connections with actuating shafts 9 and 10 which project from one side of the chassis beneath the running board of the automobile and have their outer ends adapted for engagement by a turning crank or the like so that they may be individually rotated in order to selectively move the jacks into engagement with the ground and thereby elevate either one or all of the wheels of the automobile.

Each of the jacks includes a casing 11 which is preferably formed of metal and carries a clamp 12 adapted to be passed about the axle to which the jack is to be secured, as shown in Fig. 5, and having upper and lower arms joined by a bolt 13 which, when tightened, will serve to draw the clamp into tight binding engagement with the axle and firmly hold the casing in proper position. A bearing bracket 14 is disposed within the upper portion of the casing 11 and is formed with upper and lower bearing sleeves 15 and 16 which extend at right angles to each other. A threaded post 17 extends through the casing and is passed through openings 18 and 19 formed in the upper and lower walls of the casing. It should be noted that the lower wall 20 is removably secured by screws or bolts 21 and that the opening 19 formed therein is shaped to provide a tongue 22 which extends into a longitudinally extending slot 23 formed in the post so that the post will be prevented from having rotary motion.

A gear 24 which bears against the bearing sleeve 15 is threaded upon the post 17 and meshes with a gear 25 carried by a shaft 26 which projects outwardly through a slot 27 formed in a side wall of the casing 11. From an inspection of Fig. 5, it will be readily seen that, when the shaft 26 is rotated, rotary motion will be transmitted to the gear 24 and as the gear 24 turns upon the post its threaded connection with the post will cause the post to be moved vertically either upwardly or downwardly according to the direction in which the gear rotates. At its lower end the post carries a ground-engaging base plate 28 which may be swiveled to the post and will provide a very good bearing surface to engage the ground and cause the chassis to be lifted. It should also be noted that the ground-engaging base plate which is preferably rectangular in shape, as shown in Fig. 7, has its corner portions provided with openings so that securing bolts 29 may be passed through the base plate and releasably connect a caster 30 with the base plate. By this arrangement a caster may be applied to one of the jacks and serve as an emergency wheel in case a puncture or blow-out is received or one of the wheels of the automobile should become broken in an accident.

The driven shafts 4 and 5 are of a duplicate construction and each includes end sections 31 and 32 having squared portions 33 and 34 which extend into a sleeve 35 so that the driven shafts may be longitudinally adjusted when applied to either a large or a small automobile. The end sections 31 of the driven shafts are connected with the shafts 26 of the jacks by universal joints 36 and the end sections 32 are connected with shafts 37 by universal joints 38. It will thus be seen that the axles and the side bars of the chassis may have vertical movement relative to each other when the automobile is passing over rough roads without the shafts 4 and 5 being bent or broken. It will also be noted that since the shafts 26 pass through transversely extending slots formed in the casings 11 the clamps may be easily applied to the front axle and rear axle casing without special care being taken when applying the clamps.

The gear housings 7 and 8 which are disposed at opposite sides of the chassis are of a similar construction although one is of greater length than the other and each carries a suspending bracket 39 which projects upwardly from the gear housing and is riveted or otherwise secured to the adjacent side bar of the chassis. These gear housings extend longitudinally of the chassis and each has its end walls formed with bearings 40 to rotatably receive the shafts 37, as shown in Fig. 3. Within the gear housings the shafts 37 carry gears 41 which mesh with gears 42 carried by the actuating shafts 9 and 10. The shafts 10 project outwardly through bearings 43 formed in the outer side wall of the gear housing 8 and are of solid construction, whereas the shafts 9 are formed in sections so that they may be longitudinally adjusted according to the width of the chassis frame. Referring to Fig. 1, it will be seen that each shaft 9 includes end sections 44 which carry the gears 42 and project inwardly from the gear housing 7 and companion end sections 45 which extend through the gear housing 8 between the shafts 10 and are rotatably mounted in bearings 46, as shown in Fig. 3. The adjacent ends of the shaft sections 44 and 45 are squared and slidably received in sleeves 47 which are similar in construction to the sleeves 35. It will thus be seen that the shafts constituting the operating mechanism for the jacks may be easily adjusted longitudinally to conform to the length and width of the chassis frame to which they are to be applied and, therefore, the jacks may be used in connection with either a large or a small automobile.

When the improved jacks are applied to the automobile, the casings 11 are first secured to the front axle and rear axle casing by their clamps 12 and the gear housings 7 and 8 then secured to the side bars of the chassis in such position that the outer end portions of the shafts 9 and 10 will project beneath the running board at one side of the automobile. The outer ends of the shafts 9 and 10 preferably terminate close to the outer edge of the running board so that they may be easily engaged by a turning crank when it is desired to operate one or more of the jacks. In order to move a wheel upwardly out of engagement with the ground, the turning crank is engaged with the appropriate actuating shaft and this shaft is rotated in order to transmit rotary motion to the driven shaft with which it has geared connection in the gear housing and as the driven shaft is rotated rotary motion is imparted to the gear 24 and the post upon which this gear is mounted will be moved downwardly until its base plate contacts with the ground. Further rotation of the gear will then cause one side of the axle to be moved upwardly and elevate the wheel of the automobile until it is out of engagement with the ground. A punctured tire can then be easily removed and a new one applied. If the tire has received a blow-out or a wheel of the automobile broken, a caster may be applied to the base plate of the jack and this caster will engage the ground and constitute an emergency wheel. When the automobile is placed in a garage all of the jacks may be lowered in order to elevate it and relieve the tires from pressure caused by the weight of the automobile.

Having thus described the invention, I claim:

1. In combination with a vehicle chassis including side bars and front and rear axles, bearings carried by said axles, posts movable vertically through said bearings, gear housings carried by the respective side bars intermediate the length of said chassis, driven shafts extending longitudinally of said chassis with their outer ends extending into said bearings and their inner ends into the gear housing on the respectively adjacent side bar, actuating shafts extending transversely of said chassis and having ends projecting from one side of said chassis whereby said shafts may be selectively rotated at a single operating point the other ends of the actuating shafts being each disposed within one of said gear housings and having geared connection with a driven shaft therein, and means for transmitting vertical movement to said posts from companion driven shafts when the respective actuating shafts are rotated.

2. In combination with a vehicle chassis including side bars and front and rear axles, jacks carried by said axles adjacent said side bars and each including a casing, a threaded post slidable vertically through the casing and held against rotation, driven shafts extending longitudinally of said chassis and each having its outer end extending into the casing of one of the jacks and geared to the post therein whereby to impart vertical movement to the posts when the driven shafts are rotated, gear housings carried by said side bars intermediate said axles and each receiving the inner ends of the driven shafts at the same side of the chassis, actuating shafts disposed transversely of said chassis and journaled in and projecting laterally from one of said housings and geared to the respectively adjacent ends of the driven shafts entering the housing, and other actuating shafts extending across the chassis into the other gear housing and geared therein to the driven shafts extending into the same, the last-mentioned actuating shafts projecting laterally adjacent the first-mentioned actuating shafts and passing through the housing in which said first-mentioned actuating shafts are journaled.

3. In combination with a vehicle chassis including side bars and front and rear axles, jacks carried by said axles adjacent said side bars and each including a casing, a threaded post slidable vertically through the casing and held against rotation, driven shafts extending longitudinally of said chassis and each having its outer end extending into the casing of one of the jacks and geared to the post therein whereby to impart vertical movement to the posts when the driven shafts are rotated, gear housings carried by said side bars intermediate said axles and each receiving the inner ends of the driven shafts at the same side of the chassis, actuating shafts disposed transversely of said chassis and journaled in and projecting laterally from one of said housings and geared to the respectively adjacent ends of the driven shafts entering the housing, and other actuating shafts extending through said gear housing and across the chassis into the other gear housing and geared therein to the driven shafts extending into the same, the last-mentioned actuating shafts and all the driven shafts being telescopic whereby to conform to the length and width of the chassis.

4. In combination with a vehicle chassis including side bars and front and rear axles, jacks carried by said axles adjacent said side bars and each including a casing, a clamp carried thereby and secured about the adjacent axle, a bearing bracket in said casing having upper and lower bearing sleeves disposed at a right angle to each other, a threaded post extending vertically through the casing and the upper bearing sleeve and held against rotation, a gear threaded upon said post below and bearing against the upper bearing sleeve, driven shafts extending longitudinally of said chassis adjacent the respective side bars and having end portions projecting into the casings of the respective jacks and rotatably supported by the lower bearing sleeves of the bearing brackets in the casings, gears carried by said driven shafts below and meshing with the gears upon the posts of the jacks whereby the first gears may be rotated to impart vertical movement to the posts when the driven shafts are rotated, and means for selectively rotating the driven shafts.

In testimony whereof I affix my signature.

FRANCIS C. CASEY. [L. S.]